United States Patent [19]

Saxl

[11] 4,065,963
[45] Jan. 3, 1978

[54] TENSION METER

[76] Inventor: Erwin J. Saxl, Pin Hill, Harvard, Mass. 01451

[21] Appl. No.: 703,591

[22] Filed: July 8, 1976

[51] Int. Cl.² .............................................. G01L 5/04
[52] U.S. Cl. ..................................................... 73/144
[58] Field of Search ................................... 73/143, 144

[56] References Cited

U.S. PATENT DOCUMENTS

| | | | |
|---|---|---|---|
| 2,723,561 | 11/1955 | Chaya et al. | 73/144 |
| 3,177,708 | 4/1965 | Saxl | 73/144 |
| 3,372,582 | 3/1968 | Weiss et al. | 73/144 |
| 3,739,633 | 6/1973 | Saxl | 73/144 |

Primary Examiner—Anthony V. Ciarlante

[57] ABSTRACT

A tension meter having a central feeler arm mounted on a base for movement of at least a portion thereof relatively thereto, sensing means mounted on the base for sensing movement of the central feeler arm movable portion and a pair of parallel side feeler arms positioned on opposite sides of the central feeler arm and generally parallel thereto, the side feeler arms being mounted on the base for simultaneous movement away from the central feeler arm into inoperative position for receiving a sheet or strand to be measured and toward the central feeler arm in operative position to measure the tension of the sheet or strand. For moving the sensing means responsive to the feeler arm movable portion, cam and follower means may be interposed therebetween.

6 Claims, 5 Drawing Figures

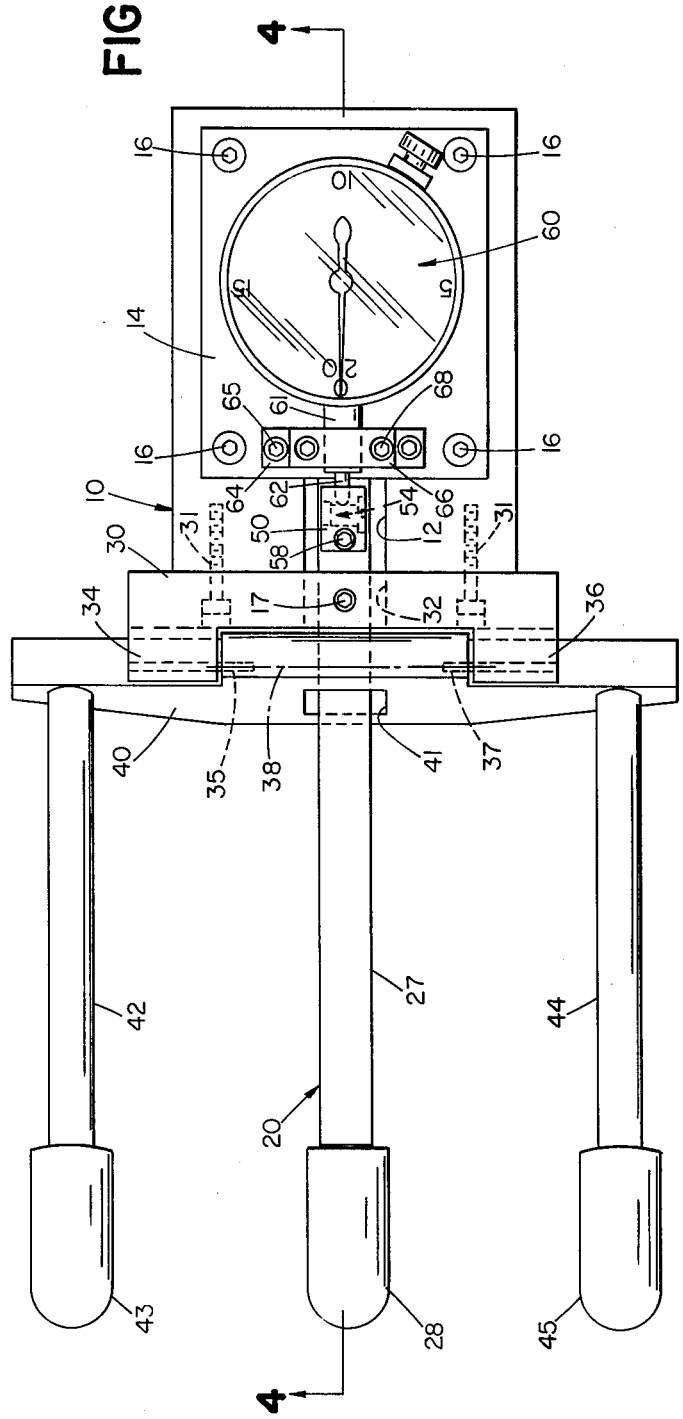
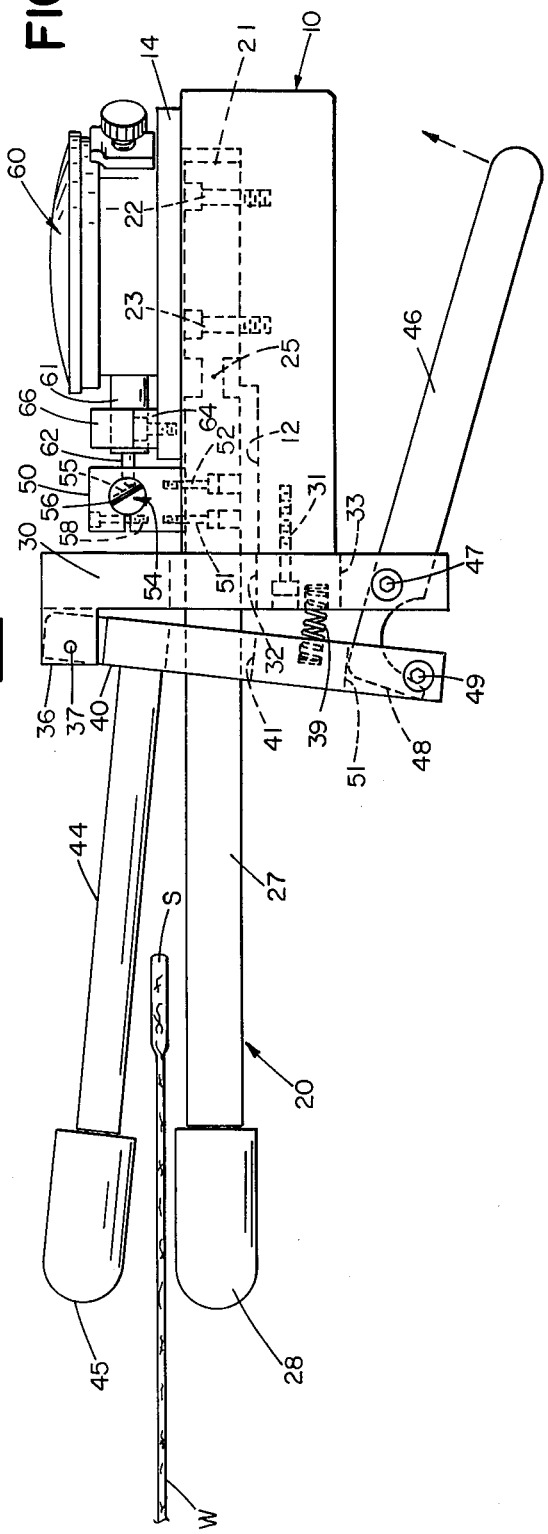

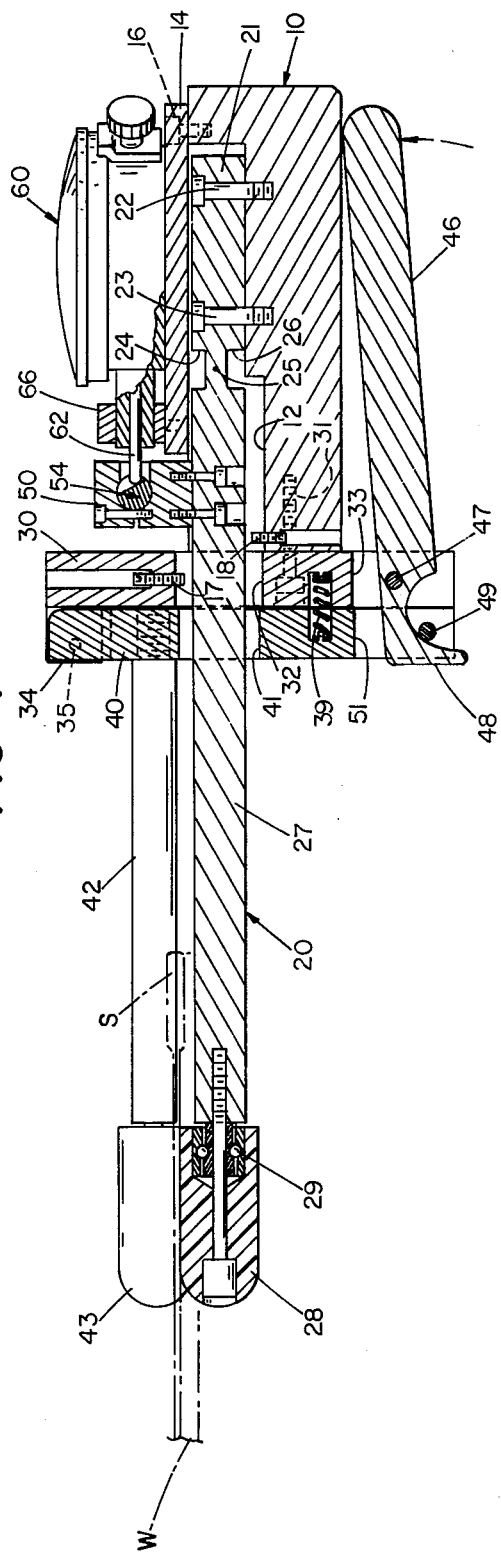
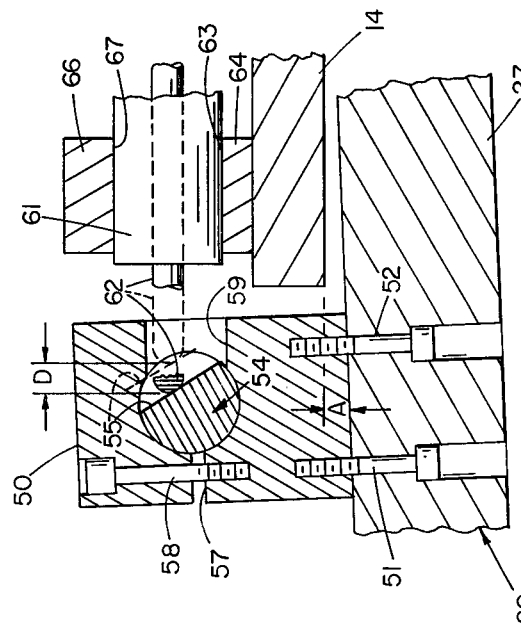
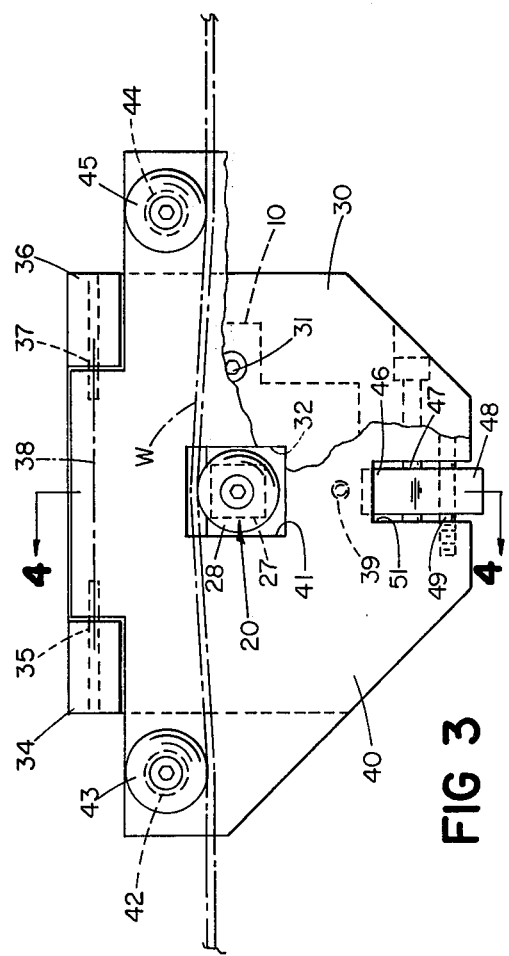

TENSION METER

BACKGROUND OF THE INVENTION

This invention relates to tension measuring instruments.

Tension meters of the type shown in U.S. Pat. No. 2,723,561 and my U.S. Pat. No. 3,879,999 have long been used to measure tensions both in strands and in limited portions of sheet and web materials. They have proved to be deficient, however, in their ability to measure the tension of sheet materials, either continuous films or woven webs, such as knitted or woven fabrics, particularly when an enlarged selvedge edge is present, making it necessary to measure the sheet tension at some distance inwardly from the selvedge edge of the sheet.

They have also proved to be deficient in their ability to measure the tension of sheets or strands, such as of wire cable, in relatively inaccessable locations, into which the body of the instrument cannot be introduced.

SUMMARY OF THE INVENTION

Accordingly, it is a major object of the present invention to provide a novel tension meter capable of measuring the tension of sheet material at a considerable distance inwardly from the edge thereof.

It is another object of the present invention to provide a novel tension meter capable of measuring the tension of sheet or strand material in relatively inaccessable locations.

It is still another object of the invention to provide a hand-held tension meter which is rugged in construction, easy to use and adaptable for use over a wide range of sheet and strand materials and operating conditions.

The above and still further objects and features are accomplished by the present invention, in one aspect thereof, by providing a tension meter comprising a base, a central feeler arm mounted on the base for movement of at least a portion thereof relatively thereto, sensing means mounted on the base for sensing movement of the central feeler arm movable portion and a pair of parallel side feeler arms positioned on opposite sides of the central feeler arm and generally parallel thereto, the side feeler arms being mounted on the base for simultaneous movement away from the central feeler arm into inoperative position for receiving a sheet or strand to be measured and toward the central feeler arm in operative position to measure the tension of the sheet or strand. Preferably, the feeler arms all have rollers mounted thereon at their free ends for contacting the sheet or strand.

Mounting means may be provided for the side feeler arms, supporting them for simultaneous pivotal movement on the base away from the central feeler arm into inoperative position for receiving a sheet or strand to be measured and toward the central feeler arm into operative position to measure the tension of the sheet or strand, the mounting means including a feeler arm supporting plate mounted on the base for pivotal movement about an axis parallel to the plane of the feeler arms.

Releasable locking means may be provided for locking the plate with the side feeler arms in operative position, including cooperating means mounted on the plate and base, preferably having an operating lever mounted on the base.

In another aspect, the invention provides a tension meter comprising a base, a feeler arm having a longitudinal axis mounted on the base for movement of at least a portion thereof in a direction generally perpendicular to said axis, sensing means mounted on the base, the sensing means having a sensing element movable in a plane generally parallel to the feeler arm longitudinal axis, and cam and follower means interposed between the sensing element and the movable portion of the feeler arm, whereby the sensing element is moved responsive to movement of the movable feeler arm portion. Preferably, the feeler arm has a fixed portion mounted on the base and a movable portion integrally connected thereto by an intermediate portion of reduced cross section, and the cam and follower means includes cam means, in the form of a cam surface adjustably positioned at an angle to the feeler arm and sensing means axes, mounted on the feeler arm and follower means mounted on the sensing element.

BRIEF DESCRIPTION OF THE DRAWINGS

For the purpose of more fully explaining the various objects and features of the invention, reference is now made to the following detailed description of a preferred embodiment thereof, together with the attached drawings, wherein:

FIGS. 1, 2 and 3 are, respectively, top, side and end views of a tension meter constructed according to the invention;

FIG. 4 is a side sectional view of the tension meter of FIGS. 1, 2 and 3, taken on lines 4—4 of FIGS. 1 and 3; and FIG. 5 is an enlarged detail view of a portion of FIG. 4.

Referring to the drawings, the tension meter of the invention has a base 10 which provides a grip or handle for the instrument. Base 10 has a central recess 12 extending through the forward end of said base for receiving therein an elongated central feeler arm, generally designated 20, having a longitudinal axis. A base mounting plate 14, mounted on base 10 by screws 16, extends across the rear portion of recess 12. Central feeler arm 20 is of integral construction and has a fixed portion 21 mounted on base 10 on the lower surface of central recess 12 by screws 22 and 23, an intermediate hinge portion 25 of reduced cross-sectional area, provided by upper and lower opposed grooves 24 and 26, and a movable forward portion 27 having a sheet or strand contacting roller 28 rotatably mounted on the free end thereof by suitable bearings 29. Roller 28 is of substantially greater diameter than is arm 20.

Base 10 has mounted on the forward face thereof a base place member 30 by screws 31 extending into the forward face of said base. Plate member 30 has a central aperture 32 providing clearance for central feeler arm 20, and at its upper end, has a pair of spaced, forwardly extending lug portions 34 and 36, having inwardly extending pins 35 and 37, respectively.

On said pins is pivotally mounted a supporting plate 40 for pivotal movement about transverse axis 38, perpendicular to the central feeler arm axis. Supporting plate 40 also has a central aperture 41 providing clearnace for central feeler arm 20. A compression spring 39, mounted in opposed, facing recesses in plates 30 and 40, urges said plates toward an open position.

A pair of parallel, elongated side feeder arms 42 and 44 are rigidly mounted on supporting plate 40, said arms being transversly spaced from one another and positioned on opposite sides of central feeler arm 20, generally parallel thereto, defining a side feeler arm plane. Each of side feeler arms 42 and 44 has a sheet or strand contacting roller, 43 and 45, respectively, of greater diameter than said side feeler arms, rotatably mounted on the free end thereof by suitable bearings, not shown, but similar to central feeler arm bearing 29.

A releasable locking mechanism is provided for locking supporting plate 40 in contact with base plate member 30, such mechanism including operating lever 46 pivotally mounted in base plate member recess 33 by pin 47. Lever 46 has a forward hook portion 48 for engaging a cooperating pin 49 in recess 51 on the bottom of supporting plate 40.

For sensing the movement of the movable portion 27 of central feeler arm 20 relatively to base 10 and side arms 42 and 44, a supporting block 50 is mounted on the upper surface of central feeler arm movable portion 27 by means of screws 51 and 52. Block 59 has, transversely mounted therein in a suitable bore, an angularly adjustable cam member 54 having a cam surface 55, adjustment of which is effected by a screwdriver groove 56 thereon. A transverse slot 57, extending from said bore to the forward face of block 50, and a clamping screw 58 therefor, is provided for locking cam member 54 with its cam surface 55 at the desired angle. An access aperture 59 for cam surface 55 is provided in the rear face of block 50.

A conventional dial indicator 60, mounted on base mounting plate 14 by a suitable clamping block for receiving stem 61 of said indicator, is utilized for sensing the movement of cam surface 55 by utilizing its movable shaft 62 received through aperture 59 as the sensing element and cam surface follower therefor. More specifically, a lower clamping block half 64 having an upper central semicircular groove 63 is mounted on base mounting plate 14 by screws 65. An upper clamping block half 66 having an opposed semicircular groove 67 is mounted by screws 68 on lower clamping block half 64 with dial indicator stem 61 therebetween, so that the dial indicator movable shaft 62 is movable in a direction generally parallel to the longitudinal axis of central feeler arm 20.

Upward deflection of the movable portion 27 of central feeler arm 20 may be limited by adjusting screw 17 in plate member 30 and downward deflection by screw 18 in base 10.

In use, the tension meter of the invention is shown in FIGS. 1 and 2 in its inoperative position and in FIGS. 3 and 4 in its operative position. Both positions are illustrated in FIG. 5, as will hereinafter appear.

Referring first to FIGS. 1 and 2, with compression spring 39 urging plates 30 and 40 to their open position and lever 46 in its down position as urged by said spring, the plane of side feeler arms 42 and 44 is in tilted inoperative position above central feeler arm 20 so as that a sheet W having an enlarged selvedge edge S can be introduced therebetween with said selvedge edge inwardly of rollers 28, 43 and 45. In inoperative position, as shown in FIG. 5 in dotted lines, the movable portion 27 of central feeler arm portion is urged upwardly by the spring hinge action of its intermediate hinge portion 25, either into contact with the lower surface of base plate 14 or with upper adjustment screw 17. Cam surface 55 will then be positioned in its dotted line position and dial indicator shaft 62 in its dotted line position as shown in FIG. 5.

After sheet W has been so introduced, side feeler arms 42 and 44 are moved to their operative position by moving lever 46 upwardly, to its position as shown in FIGS. 3 and 4, until plates 30 and 40 are in contact. This action will deflect sheet W, as shown in said Figs., and will bend central feeler arm 20 downwardly about its intermediate hinge portion 25 to a degree proportional to the tension of sheet W. As shown in more detail in FIG. 5, this action will move the movable portion 27 of feeler arm 20 at the center of block 50 downwardly for a distance A, in a direction generally perpendicular to the longitudinal axis of central feeler arm 20. This will also move cam surface 55 downwardly to its solid line position in FIG. 5, so that the cam follower end of dial indicator shaft 61 will move for a distance D as shown in said Fig., causing an indicator movement of said dial indicator proportional to the tension of sheet W.

When the desired tension measurement has been completed, all that is necessary is to release lever 46 and remove the tension meter from the sheet material W.

The tension of a strand may be similarly measured by contacting it with rollers 28, 43 and 45, the elongated feeler arms 20, 42 and 44 enabling such a measurement to be made even when the strand is in a relatively inaccessable location into which the body of the tension meter cannot be introduced.

I claim:
1. A tension meter comprising
   a base
   a central feeler arm mounted on said base for movement of at least a portion thereof relatively thereto
   sensing means mounted on said base for sensing movement of said central feeler arm movable portion
   a pair of parallel side feeler arms positioned on opposite sides of said central feeler arm and generally parallel thereto and defining a side feeler arm plane
   mounting means for said side feeler arms including a side feeler arm supporting plate mounted on said base for pivotal movement about an axis parallel to said side feeler arm plane, said plate being pivotally movable between an operative position in contact with said base and an inoperative position away from said base and supporting said side feeler arms for simultaneous pivotal movement on said base away from said central feeler arm into inoperative position for receiving a sheet or strand to be measured and toward said central feeler arm in operative position to measure the tension of said sheet or strand by moving the movable portion of said central feeler arm, and
   releasable locking means for locking said plate in contact with said base with said side feeler arms in said operative position, said releasable locking means including a transverse pin member mounted on said plate and an operating lever pivotally mounted on said base, said operating lever being pivotally movable toward said base into operative position and having a hook portion engaging said pin member to move said plate into its operative position in contact with said base.

2. A tension meter as claimed in claim 1, further including
   spring means normally urging said plate into its inoperative position away from said base, said lever into its inoperative position away from said base and said side feeler arms away from said central feeler arm into their inoperative position.

3. A tension meter as claimed in claim 2, wherein said spring means is compression spring means interposed between said plate and said base.

4. A tension meter comprising a base a central feeler arm having a longitudinal axis, said feeler arm having a fixed portion mounted on said base and a movable portion integrally connected to said fixed portion and having a sheet or strand contacting roller mounted on the free end thereof, said movable portion being movable in a direction generally perpendicular to said central feeler arm longitudinal axis sensing means mounted on said base for sensing movement of said central feeler arm movable portion, said sensing means having a sensing element movable in a direction generally parallel to said central feeler arm longitudinal axis cam and follower means interposed between said sensing element and the movable portion of said central feeler arm for moving said sensing element responsive to movement of said feeler arm portion, said cam and follower means including a cam surface follower mounted on said sensing element, a supporting member having a transversely extending bore generally perpendicular to said central feeler arm longitudinal axis mounted on the movable portion of said central feeler arm, a cylindrical cam member having a generally flat cam surface portion rotatably mounted in said bore for angular adjustment of said cam surface portion and clamping means on said supporting member for locking said cam member in its angularly adjusted position a pair of parallel side feeler arms positioned on opposite sides of said central feeler arm and generally parallel thereto and defining a side feeler arm plane, each said side feeler arm having a sheet or strand contacting roller mounted on the free end thereof mounting means for said side feeler arms including a side feeler arm supporting plate mounted on said base for pivotal movement about an axis parallel to said side feeler arm plane, said plate being pivotally movable between an operative position in contact with said base and an inoperative position away from said base and supporting said side feeler arms for simultaneous pivotal movement on said base away from said central feeler arm into inoperative position for receiving a sheet or strand to be measured and toward said central feeler arm in operative position with said sheet or strand contacting rollers in contact with said sheet or strand to measure the tension of said sheet or strand by moving the movable portion of said central feeler arm releasable locking means for locking said plate in contact with said base with said side feeler arms in said operative position, said releasable locking means including a transverse pin member mounted on said plate and an operating lever pivotally mounted on said base, said operating lever being pivotally movable toward said base into operative position and having a hook portion engaging said pin member to move said plate into its operative position in contact with said base, and compression spring means interposed between said plate and said base normally urging said plate into its inoperative position away from said base, said lever into its inoperative position away from said base and said side feeler arms away from said central feeler arms into their inoperative position.

5. A tension meter comprising a base a central feeler arm having a longitudinal axis, said feeler arm having a fixed portion mounted on said base and a movable portion integrally connected to said fixed portion and having a sheet or strand contacting portion on the free end thereof, said movable portion being movable in a direction generally perpendicular to said central feeler arm longitudinal axis sensing means mounted on said base for sensing movement of said central feeler arm movable portion, said sensing means having a sensing element movable in a direction generally parallel to said central feeler arm longitudinal axis cam and follower means interposed between said sensing element and the movable portion of said central feeler arm for moving said sensing element responsive to movement to said feeler arm portion, said cam and follower means including a cam surface follower mounted on said sensing element, a cylindrical cam member having a generally flat cam surface portion rotatably mounted in a transversely extending bore on the movable portion of said central feeler arm for angular adjustment of said cam surface portion and means for locking said cam member in its angularly adjusted position a pair of parallel side feeler arms positioned on opposite sides of said central feeler arm and generally parallel thereto and defining a side feeler arm plane, each said side feeler arm having a sheet or strand contacting portion on the free end thereof mounted means for said side feeler arms including a side feeler arm supporting plate mounted on said base for pivotal movement about an axis parallel to said feeler arm plane, said plate being pivotally movable between an operative position in contact with said base and an inoperative position away from said base and supporting said side feeler arms for simultaneous pivotal movement on said base away from said central feeler arm into inoperative position for receiving a sheet or strand to be measured and toward said central feeler arm in operative position with said sheet or strand contacting portions in contact with said sheet or strand to measure the tension of said sheet or strand by moving the movable portion of said central feeler arm releasable locking means for locking said plate in contact with said base with said side feeler arms in said operative position, said releasable locking means including a transverse pin member mounted on said plate and an operating lever pivotally mounted on said base, said operating lever being pivotally movable toward said base into operative position and having a hook portion engaging said pin member to move said plate into its operative position in contact with said base, and spring means normally urging said plate into its inoperative position away from said base, said lever into its inoperative position away from said base and said side feeler arms away from said central feeler arm into their inoperative position.

6. A tension meter as claimed in claim 5, wherein said spring means is compression spring means interposed between said plate and said base.

* * * * *